(12) United States Patent
Mallick et al.

(10) Patent No.: US 10,637,917 B2
(45) Date of Patent: Apr. 28, 2020

(54) HOST DEVICE LOAD BALANCING USING PORT LOAD REPORTED BY STORAGE SYSTEM

(71) Applicant: EMC IP Holding Company LLC, Hopkinton, MA (US)

(72) Inventors: Sanjib Mallick, Bangalore (IN); Vinay G. Rao, Bangalore (IN); Jaeyoo Jung, Shrewsbury, MA (US); Arieh Don, Newton, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 72 days.

(21) Appl. No.: 15/966,210

(22) Filed: Apr. 30, 2018

(65) Prior Publication Data

US 2019/0334982 A1 Oct. 31, 2019

(51) Int. Cl.
*H04L 29/08* (2006.01)

(52) U.S. Cl.
CPC ...... *H04L 67/1012* (2013.01); *H04L 67/1025* (2013.01)

(58) Field of Classification Search
CPC .................. H04L 67/1012; H04L 67/1025
See application file for complete search history.

(56) References Cited

U.S. PATENT DOCUMENTS

| | | | |
|---|---|---|---|
| 6,567,397 B1 * | 5/2003 | Campana, Jr. | ........ H04L 1/0001 370/349 |
| 6,687,746 B1 | 2/2004 | Shuster et al. | |
| 6,697,875 B1 | 2/2004 | Wilson | |
| 7,454,437 B1 | 11/2008 | Lavallee et al. | |
| 7,818,428 B1 | 10/2010 | Lavallee et al. | |
| 7,925,872 B2 | 4/2011 | Lai et al. | |

(Continued)

OTHER PUBLICATIONS

Vmware, "Multipathing Configuration for Software iSCSI Using Port Binding," Technical White Paper, Apr. 25, 2012, 15 pages.

(Continued)

*Primary Examiner* — Walter J Divito
(74) *Attorney, Agent, or Firm* — Ryan, Mason & Lewis, LLP

(57) ABSTRACT

An apparatus in one embodiment comprises a host device configured to communicate over a network with a storage system comprising a plurality of storage devices. The host device includes a set of input-output queues and a multi-path input-output driver configured to select input-output operations from the set of input-output queues for delivery to particular ports of the storage system over the network in accordance with a load balancing algorithm. The multi-path input-output driver is further configured to receive notification from one or more of the ports indicating that at least a given one of the ports has exceeded a designated threshold level of port load, and to adjust the load balancing algorithm based at least in part on the received notification. The notification illustratively comprises one of at least first and second possible codes for interpretation by the multi-path input-output driver, with the first code being associated with a current port load value for the given port, and the second code being associated with a wait time before sending additional input-output operations to the given port.

20 Claims, 2 Drawing Sheets

(56) References Cited

U.S. PATENT DOCUMENTS

| | | | |
|---|---|---|---|
| 9,026,694 B1* | 5/2015 | Davidson | G06F 9/505 |
| | | | 710/38 |
| 9,594,780 B1 | 3/2017 | Esposito et al. | |
| 9,778,852 B1 | 10/2017 | Marshak et al. | |
| 2004/0010563 A1 | 1/2004 | Forte et al. | |
| 2008/0043973 A1 | 2/2008 | Lai et al. | |
| 2011/0197027 A1 | 8/2011 | Balasubramanian et al. | |
| 2016/0092136 A1* | 3/2016 | Balakrishnan | G06F 3/0635 |
| | | | 710/38 |
| 2016/0117113 A1 | 4/2016 | Li et al. | |

OTHER PUBLICATIONS

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

U.S. Appl. No. 15/795,653 filed in the name of Maneesh Pusalkar et al. on Oct. 27, 2017 and entitled "Storage System with Network-Wide Configurable Device Names."

U.S. Appl. No. 15/849,828 filed in the name of Sanjib Mallick et al. on Dec. 21, 2017 and entitled "Storage System with Input-Output Performance Control Utilizing Application Process Detection."

\* cited by examiner

HOST DEVICE LOAD BALANCING USING PORT LOAD REPORTED BY STORAGE SYSTEM

FIELD

The field relates generally to information processing systems, and more particularly to storage in information processing systems.

BACKGROUND

A wide variety of different types of storage systems are known. For example, some storage systems are configured to include multiple storage tiers, with different ones of the tiers providing different levels of performance or other characteristics. In such storage systems, data may be moved from one tier to another within a given storage system based on access frequency of the data or other factors. These and other types of tiered or non-tiered storage systems may be shared by multiple host devices of a compute cluster. However, problems can arise in such arrangements when a host device attempts to perform load balancing across multiple ports of a storage array or other storage system that is shared with other host devices. For example, in some implementations there may be hundreds of different host devices which share the same storage system, making it very difficult for any particular host device to balance input-output (IO) processing load in an effective manner across multiple ports of the storage system. Also, the IO processing load experienced by different ports of the storage system can change very quickly due to varying conditions, in some cases due to temporary spikes or surges in IO processing demand from different host devices. In these and other situations, use of conventional load balancing arrangements can lead to sub-optimal performance.

SUMMARY

Illustrative embodiments of the present invention configure a multi-path layer of one or more host devices to provide load balancing on a per-port basis for multiple ports of a shared storage array or other type of storage system. The multi-path layer illustratively comprises at least one multi-path input-output (MPIO) driver configured to process IO operations for delivery from a corresponding host device to the storage system. Such arrangements utilize port load information reported by the storage system to one or more MPIO drivers of respective ones of the host devices. These and other embodiments overcome the problems that can otherwise result when a host device attempts to evenly balance IO processing load across multiple ports of a storage system without having sufficiently accurate port load information, possibly due to temporary spikes or surges in IO processing demand from other host devices.

In one embodiment, an apparatus comprises a host device configured to communicate over a network with a storage system comprising a plurality of storage devices. The host device includes a set of IO queues and an MPIO driver configured to select IO operations from the set of IO queues for delivery to particular ports of the storage system over the network in accordance with a load balancing algorithm. The MPIO driver is further configured to receive notification from one or more of the ports indicating that at least a given one of the ports has exceeded a designated threshold level of port load, and to adjust the load balancing algorithm based at least in part on the received notification.

The notification illustratively comprises one of at least first and second possible codes to be interpreted by the MPIO driver of the host device. For example, the first code may indicate that a particular portion of the notification contains a current port load value for the given port, and the second code may indicate that a particular portion of the notification contains information specifying an amount of time that the MPIO driver should wait before sending additional IO operations to the given port.

Adjusting the load balancing algorithm in some embodiments comprises implementing a first type of adjustment to the load balancing algorithm responsive to receipt of the first code in the notification, and implementing a second type of adjustment to the load balancing algorithm different than the first type of adjustment responsive to receipt of the second code in the notification.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
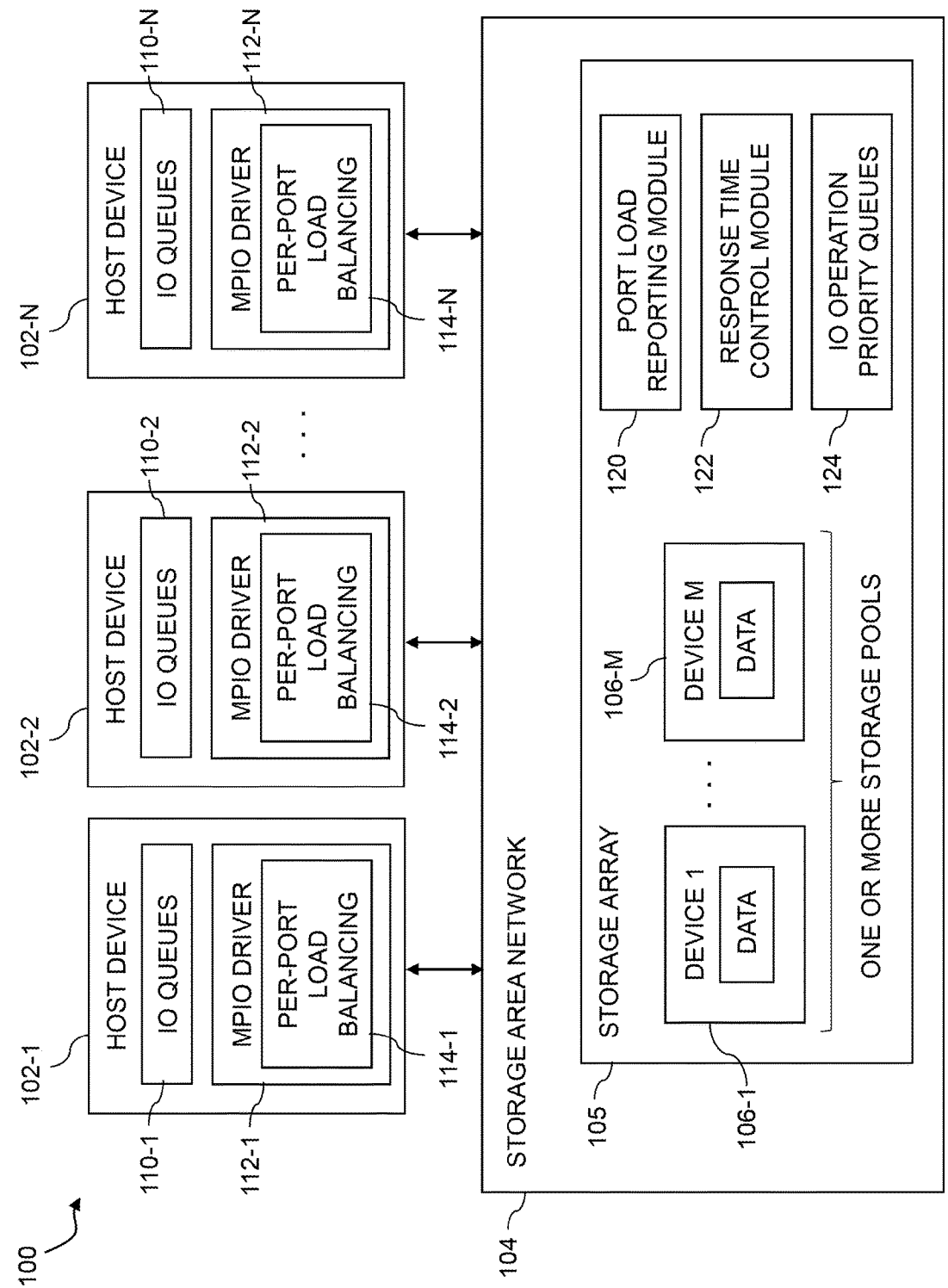
FIG. 1 is a block diagram of an information processing system configured with functionality for per-port load balancing utilizing a multi-path layer of a host device in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system."

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a platform-as-a-service (PaaS) model, although it is to be appreciated that numerous other cloud infrastructure arrangements could be used.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN. A logical storage device can be defined in the storage array 105 to include different portions of one or more physical storage devices. Storage devices 106 may therefore be viewed as comprising respective LUNs or other logical storage devices.

Each of the host devices 102 may have multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective MPIO drivers 112-1, 112-2, . . . 112-N. The MPIO drivers 112 collectively comprise a multi-path layer of the host devices 102. The multi-path layer provides functionality for per-port load balancing using respective per-port load balancing modules 114-1, 114-2, . . . 114-N implemented within the MPIO drivers 112.

The MPIO driver 112-1 is configured to select IO operations from its corresponding set of IO queues 110-1 for delivery to particular ports of the storage array 105 over the SAN 104 in accordance with a load balancing algorithm. The MPIO driver 112-1 is further configured to receive notification from one or more of the ports indicating that at least a given one of the ports has exceeded a designated threshold level of port load, and to adjust the load balancing algorithm based at least in part on the received notification.

These and other functions of the MPIO driver 112-1 are carried out at least in part under the control of its per-port load balancing module 114-1. For example, the per-port load balancing module 114-1 is illustratively configured to control performance of the steps of the flow diagram to be described below in conjunction with FIG. 2.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105, and the MPIO drivers 112 of such other host devices are each similarly configured to select IO operations from its corresponding one of the sets of IO queues 110 for delivery to particular ports of the storage array 105 over the SAN 104 in accordance with a load balancing algorithm.

The MPIO drivers 112 may comprise otherwise conventional MPIO drivers, such as PowerPath drivers from Dell EMC, suitably modified in the manner disclosed herein to perform per-port load balancing utilizing port load information reported from a storage system such as storage array 105.

The sources of the IO operations stored in the sets of IO queues 110 illustratively include respective processes of one or more applications executing on the one or more of the host devices 102. Other types of sources of IO operations may be present in a given implementation of system 100.

In some embodiments, the MPIO driver 112-1 of the host device 102-1 is configured to periodically send at least one predetermined command to one or more of the ports requesting a current port load value. For example, port load information may be stored in a persistent memory of the storage array 105, and read from the persistent memory utilizing one or more commands generated in the host device 102-1.

The persistent memory may comprise a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The one or more predetermined commands utilized by the MPIO driver 112-1 to read port load information from the storage array 105 can include commands that are part of a standard command set or may include custom commands such as a "vendor unique command" or VU command that is not part of a standard command set. As a more particular example, a given predetermined command can include a VU mode sense command, a VU log sense command, or another type of VU command.

These and other commands used by the host devices 102 to communicate with the storage array 105 illustratively comprise SCSI commands, although as noted above other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein.

In some embodiments, a single predetermined command may be directed to one of the ports, and may include a payload that when processed in the storage array 105 covers all of the ports in substantially the same manner. In arrangements of this type, it is not necessary to send a separate predetermined command to each port.

The MPIO driver 112-1 of the host device 102-1 is configured to utilize current port load values received from respective ones of the ports in response to the one or more predetermined commands to substantially evenly distribute processing of the IO operations selected from the IO queues 110-1 across the ports of the storage array 105 in accordance with the load balancing algorithm.

The above-mentioned notification received by the MPIO driver 112-1 to indicate that at least one of the ports of the storage array 105 has exceeded a designated threshold level of port load, also referred to in the context of some embodiments herein as an over-threshold notification, illustratively comprises a current port load value for the given port that is greater than the threshold level of port load.

The notification can include additional information, such as an indication that at least one IO operation previously delivered to the given port by the host device 102-1 is designated by the storage array 105 as a failed IO operation. The MPIO driver 112-1 in this case is configured to resend the IO operation designated as a failed IO operation in the notification from the given port to another one of the ports.

In some embodiments, the notification comprises one of at least first and second possible codes for interpretation by the MPIO driver 112-1. Additional codes beyond the first and second codes may be used.

By way of example, the first code may indicate that a particular portion of the notification contains a current port load value for the given port, and the second code may indicate that a particular portion of the notification contains information specifying an amount of time that the MPIO driver 112-1 should wait before sending additional IO operations to the given port. It should be noted that the "particular portion" of the notification that is indicated as containing certain information can in some embodiments comprise the first or second code itself. Accordingly, inclusion of a particular code in the notification can be used to convey information such as a current port load value or a specified wait time without the need for any additional information beyond the code itself. A wide variety of other types of codes and code formats may be used in other embodiments.

The codes provided by the storage array 105 in the above-described notification are utilized by the MPIO driver 112-1 to adjust the load balancing algorithm for selecting IO operations from the IO queues 110-1.

For example, adjusting the load balancing algorithm may comprise implementing a first type of adjustment to the load balancing algorithm responsive to receipt of the first code in the notification and implementing a second type of adjustment to the load balancing algorithm different than the first type of adjustment responsive to receipt of the second code in the notification.

In embodiments in which the notification comprises the second code indicating a specified amount of time that the MPIO driver 112-1 should wait before sending additional IO operations to the given port, the MPIO driver 112-1 is illustratively configured to send a first additional IO operation to the given port after waiting the specified amount of time. The MPIO driver 112-1 may then resume sending other additional IO operations to the given port in accordance with the load balancing algorithm responsive to receipt of an affirmative acknowledgement status from the given port for the first additional IO operation.

The above-described notifications are illustratively generated at least in part in a port load reporting module 120 of the storage array 105. The port load reporting module 120 is illustratively configured to monitor actual port load relative to designated threshold levels and to generate notifications to the host devices 102 as appropriate, in order to support implementation of per-port load balancing in the first MPIO driver 112-1.

Again, functionality described above in the context of the first MPIO driver 112-1 may be similarly performed by each of the other MPIO drivers 112-2 through 112-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support performance of per-port load balancing utilizing port load information reported by the storage array 105.

As indicated previously, absent use of the per-port load balancing techniques in an MPIO layer disclosed herein, it can be difficult for any particular host device such as host device 102-1 to balance IO processing load in an effective manner across multiple ports of a storage system such as storage array 105. Also, the IO processing load experienced by different ports of the storage array 105 can change very quickly due to varying conditions, in some cases due to temporary spikes or surges in IO processing demand from different ones of the host devices 102. In these and other situations, use of conventional load balancing arrangements can lead to sub-optimal performance.

Such drawbacks are advantageously overcome in illustrative embodiments herein by utilization of an MPIO layer comprising one or more of the MPIO drivers 112 to perform per-port load balancing as described above in conjunction with selection of IO operations from the sets of IO queues 110 of the host devices 102. The per-port load balancing is illustratively performed responsive to receipt of over-threshold notifications relating to particular ports as generated at least in part by the port load reporting module 120 of the storage array 105.

The storage array 105 in the present embodiment comprises additional components such as response time control module 122 and IO operation priority queues 124. The response time control module 122 may be used to implement storage array based adjustments in response time for particular IO operations based at least in part on service level objective (SLO) information stored by the storage array 105 in its persistent memory. The response time control module 122 operates in conjunction with the IO operation priority queues 124.

The storage array 105 utilizes its IO operation priority queues 124 to provide different levels of performance for IO operations. For example, the IO operation priority queues 124 may have respective different priority levels. The storage array 105 may be configured to provide different priority levels for different ones of the IO operations by assigning different ones of the IO operations to different ones of the IO operation priority queues 124. The IO operation priority queues 124 are illustratively associated with respective SLOs for processing of IO operations in the storage array 105.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array suitably reconfigured to implement reporting of port load information for per-port load balancing in an MPIO layer as disclosed herein.

For example, the storage array 105 may comprise one or more storage arrays such as VNX®, Symmetrix VMAX® and Unity™ storage arrays, commercially available from Dell EMC.

Other types of storage products that can be used in implementing a given storage system in illustrative embodiments include software-defined storage products such as ScaleIO™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible.

Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and per-port load balancing modules 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 210, and is suitable for use in the system 100 but is more generally applicable to other types of systems comprising multiple host devices and a shared storage system. The shared storage system in this embodiment is assumed to comprise at least one storage array having a plurality of storage devices.

Figure 2:
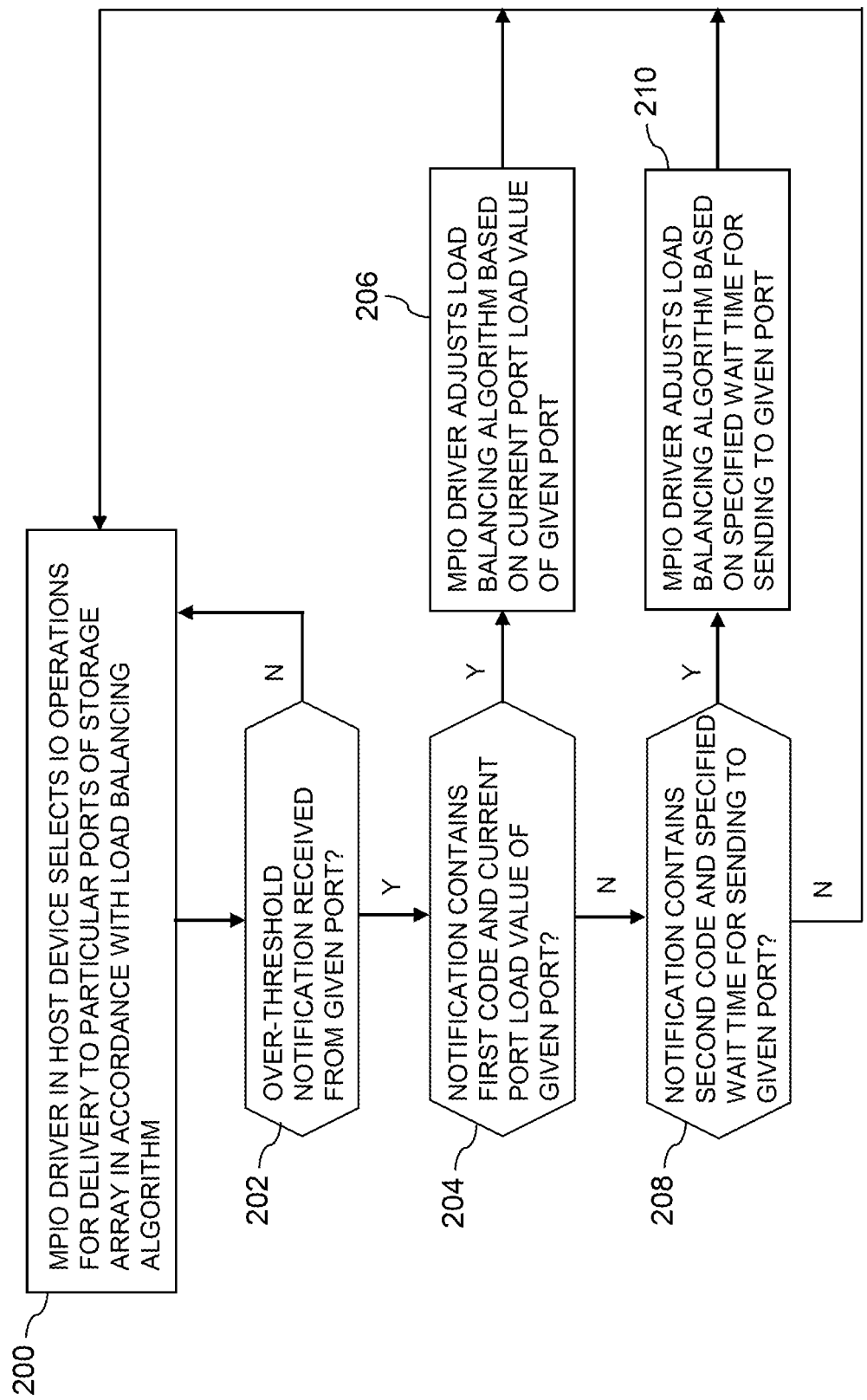
FIG. 2 is a flow diagram of a process for per-port load balancing utilizing a multi-path layer of a host device in an illustrative embodiment.

The steps of the FIG. 2 process are illustratively performed primarily by or under the control of an MPIO driver of a given host device, although other arrangements of system components can perform at least portions of one or more of the steps in other embodiments. This embodiment further assumes that the commands utilized by the host devices in generating IO operations such as read and write operations directed to the storage array comprise SCSI commands, although other types of commands can be used.

In step 200, an MPIO driver of a given host device selects IO operations for delivery to particular ports of a storage array in accordance with a load balancing algorithm. Adjustments may be made to the load balancing algorithm by the MPIO driver in steps 206 and 210 of the process, as described below, responsive to detection of certain port load conditions based on reporting from the storage array.

The sources of the IO operations illustratively include respective processes of one or more applications executing on the host device, with different processes having different SLOs. For example, in some embodiments the processes comprise respective synchronous and asynchronous processes of an application, with the synchronous process having a higher-performance SLO than the asynchronous process. As another example, the processes may comprise respective log and database processes of a database application, with the log process having a higher-performance SLO than the database process.

In step 202, a determination is made by the MPIO driver as to whether or not an over-threshold notification has been received from at least a given one of the ports. If an over-threshold notification has been received from at least the given port, the process moves to step 204, and otherwise returns to step 200 as indicated.

In step 204, a determination is made by the MPIO driver as to whether or not the notification contains a first code and a current port load value of the given port. If the notification contains those elements, the process moves to step 206, and otherwise moves to step 208.

In step 206, the MPIO driver adjusts the load balancing algorithm based on the current port value of the given port. The process then returns to step 200 to utilize the adjusted load balancing algorithm in selecting IO operations for delivery to particular ports of the storage array.

In step 208, a determination is made by the MPIO driver as to whether or not the notification contains a second code and a specified wait time for sending to the given port. If the notification contains those elements, the process moves to step 210, and otherwise returns to step 200 without adjusting the current implementation of the load balancing algorithm being utilized to select IO operations in step 200.

In step 210, the MPIO driver adjusts the load balancing algorithm based on the specified wait time for sending to the given port. The process then returns to step 200 to utilize the adjusted load balancing algorithm in selecting IO operations for delivery to particular ports of the storage array.

Multiple additional instances of the FIG. 2 process are assumed to be performed in respective additional host devices that share the storage array.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and per-port load balancing functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different per-port load balancing arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

An additional example of an illustrative embodiment implemented using the FIG. 2 process for performing per-port load balancing in an MPIO layer utilizing port load information reported by a storage array will now be described. It is assumed in this embodiment that the MPIO driver of a given host device provides per-port load balancing functionality in cooperation with the storage array, under the control of a corresponding per-port load balancing module implemented in the MPIO driver.

At predetermined intervals (e.g., once a second), the MPIO driver will send a VU mode sense command to at least one storage device on each port of the storage array to the current port load value (e.g., port % busy value). The port load value returned in this low priority port scanning operation is used by the MPIO driver in its load balancing algorithm to spread the IO operation load substantially evenly across all ports of the storage array that are visible to the corresponding host device.

It is further assumed that a storage administrator or other user of the storage array defines a particular port load threshold level (e.g., Z=40%) at which the storage array will asynchronously notify the MPIO driver of a port over-threshold condition.

Upon receipt of such an over-threshold notification, the MPIO driver alters its current load balancing algorithm in order to continue to evenly spread the IO load over the visible ports. Such adjustments help to alleviate out-of-balance conditions that might otherwise arise due to IO bursts or other sudden spikes in the port load of one or more ports.

In this embodiment, in conjunction with generation of the above-noted over-threshold notification for a given port, the storage array will fail a single IO operation at that port, and will return one of two codes to the MPIO driver in the notification:

01/XX—a first code 01 is followed by a number (XX) indicating that the port is XX % busy.

09/YY—a second code 09 is followed by a number (YY) indicating that the MPIO driver should wait YY times 5 msec before sending additional IO operations to the port.

The 09/YY notification will be returned by the storage array if the port can determine the time needed to service the IO operations currently in its queues.

The 01/XX notification will be returned by the storage array if the port can only report its busy rate.

The MPIO driver will resend the failed IO operation and one or more subsequent IO operations, to other less busy ports.

If all ports are over the threshold level Z % busy, the MPIO driver will send IO operations to the less busy ports.

In cases involving receipt of the 09/YY notification, after the specified wait time (e.g., YY times 5 msec), the MPIO will send one additional IO operation on the busy port to check whether that port is still over Z % busy. If the port returns an affirmative acknowledgement status (e.g., a "good status" indicator) for the sent IO operation, the MPIO driver resumes sending IO operations to that port in accordance with the load balancing algorithm for ports below Z % busy. If the port returns an 01/XX notification, the MPIO will receive the current % busy in the notification and use it to optimize the load balancing algorithm. If the port returns another 09/YY notification, the MPIO driver will once again wait in accordance with the specified wait time before sending further IO operations to that port.

As mentioned previously, different instances of the above-described process can be performed by different MPIO drivers in different host devices.

Again, it is to be appreciated that the particular per-port load balancing arrangements described above are presented by way of illustrative example only. Numerous alternative arrangements of these and other features can be used in implementing the FIG. 2 process and other illustrative embodiments.

The illustrative embodiments disclosed herein can provide a number of significant advantages relative to conventional arrangements.

For example, some embodiments provide per-port load balancing utilizing a multi-path layer of one or more host devices, operating in cooperation with a shared storage array or other type of storage system. The multi-path layer illustratively comprises at least one MPIO driver configured to process IO operations for delivery from a corresponding host device to the storage system. The MPIO driver receives port load information reported by the storage system and utilizes that information in selecting IO operations from host device IO queues for delivery to the storage system.

Such arrangements overcome the problems that can otherwise result when a host device attempts to evenly balance IO processing load across multiple ports of a storage system without having sufficiently accurate port load information, possibly due to temporary spikes or surges in IO processing demand from other host devices.

Illustrative embodiments allow an MPIO driver to determine actual current port load or a specified wait time for any ports that are determined by the storage array to be over a designated threshold level of port load.

The MIO driver can therefore dynamically adapt its load balancing algorithm in a manner that much more effectively evens out the IO processing load across the ports of the storage array. For example, such arrangements can prevent or otherwise avoid situations in which smaller-sized IO operations are "stuck" behind larger-sized IO operations. Other types of situations that prevent effective load balancing are similarly avoided.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments of the invention. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the per-port load balancing modules 114 may be implemented at least in part in software, as indicated previously herein.

It should again be emphasized that the above-described embodiments of the invention are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, load balancing modules and additional or alternative components. Also, the particular configurations of system and device elements and associated processing operations illustratively shown in the drawings can be varied in other embodiments. For example, a wide variety of different MPIO driver configurations and associated per-port load balancing arrangements can be used in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
a host device configured to communicate over a network with a storage system comprising a plurality of storage devices;
the host device comprising:
a set of input-output queues; and
a multi-path input-output driver configured to select input-output operations from the set of input-output queues for delivery to particular ports of the storage system over the network in accordance with a load balancing algorithm;
wherein the multi-path input-output driver is further configured:
to receive notification from one or more of the ports indicating that at least a given one of the ports has exceeded a designated threshold level of port load;
to determine whether the notification comprises a first code or a second code; and
to adjust the load balancing algorithm based at least in part on the received notification;
wherein adjusting the load balancing algorithm comprises implementing a first type of adjustment to the load balancing algorithm responsive to receipt of the first code in the notification and implementing a second type of adjustment to the load balancing algorithm different than the first type of adjustment responsive to receipt of the second code in the notification, the second code being different from the first code;
wherein the first code indicates that a particular portion of the notification contains a current port load value for the given port and wherein the multi-path input-output driver provides the first type of adjustment based at least in part on the current port load value; and wherein the second code indicates that a particular portion of the notification contains information specifying an amount of time that the multi-path input-output driver should wait before sending additional input-output operations to the given port and wherein the multi-path input-output driver provides the second type of adjustment based at least in part on the specified amount of time.

2. The apparatus of claim 1 further comprising one or more additional host devices each configured to communicate over the network with the storage system and wherein each additional host device comprises a set of input-output queues and a multi-path input-output driver configured to select input-output operations from the set of input-output queues for delivery to particular ports of the storage system over the network.

3. The apparatus of claim 1 wherein the multi-path input-output driver of the host device is configured to periodically send at least one predetermined command to one or more of the ports requesting a current port load value.

4. The apparatus of claim 3 wherein the predetermined command comprises at least one of the following commands:
  a vendor unique mode sense command;
  a vendor unique log sense command; and
  another type of vendor unique command.

5. The apparatus of claim 3 wherein the multi-path input-output driver of the host device is configured to utilize current port load values received from respective ones of the ports in response to the one or more predetermined commands to substantially evenly distribute processing of the input-output operations across the ports of the storage system in accordance with the load balancing algorithm.

6. The apparatus of claim 1 wherein the notification comprises a current port load value for the given port that is greater than the threshold level of port load.

7. The apparatus of claim 1 wherein the notification comprises an indication that at least one input-output operation previously delivered to the given port by the host device is designated as a failed input-output operation.

8. The apparatus of claim 7 wherein the multi-path input-output driver is configured to resend the input-output operation designated as a failed input-output operation in the notification from the given port to another one of the ports.

9. The apparatus of claim 1 wherein the multi-path input-output driver is configured to send a first additional input-output operation to the given port after waiting the specified amount of time.

10. The apparatus of claim 9 wherein the multi-path input-output driver is configured to resume sending other additional input-output operations to the given port in accordance with the load balancing algorithm responsive to receipt of an affirmative acknowledgement status from the given port for the first additional input-output operation.

11. A method comprising:
  configuring a multi-path input-output driver of a host device to select input-output operations from a set of input-output queues of the host device for delivery to particular ports of a storage system over a network in accordance with a load balancing algorithm;
  wherein the multi-path input-output driver in conjunction with selecting the input-output operations performs the following steps:
  receiving notification from one or more of the ports indicating that at least a given one of the ports has exceeded a designated threshold level of port load;
  determining whether the notification comprises a first code or a second code; and
  adjusting the load balancing algorithm based at least in part on the received notification;
  wherein adjusting the load balancing algorithm comprises implementing a first type of adjustment to the load balancing algorithm responsive to receipt of the first code in the notification and implementing a second type of adjustment to the load balancing algorithm different than the first type of adjustment responsive to receipt of the second code in the notification, the second code being different from the first code;
  wherein the first code indicates that a particular portion of the notification contains a current port load value for the given port and wherein the multi-path input-output driver provides the first type of adjustment based at least in part on the current port load value; and
  wherein the second code indicates that a particular portion of the notification contains information specifying an amount of time that the multi-path input-output driver should wait before sending additional input-output operations to the given port and wherein the multi-path input-output driver provides the second type of adjustment based at least in part on the specified amount of time.

12. A computer program product comprising a non-transitory processor-readable storage medium having stored therein program code of one or more software programs, wherein the program code, when executed by a host device comprising a multi-path input-output driver and a set of input-output queues, the host device being configured to communicate over a network with a storage system, causes the multi-path input-output driver:
  to select input-output operations from the set of input-output queues for delivery to particular ports of the storage system in accordance with a load balancing algorithm;
  to receive notification from one or more of the ports indicating that at least a given one of the ports has exceeded a designated threshold level of port load;
  to determine whether the notification comprises a first code or a second code; and
  to adjust the load balancing algorithm based at least in part on the received notification;
  wherein adjusting the load balancing algorithm comprises implementing a first type of adjustment to the load balancing algorithm responsive to receipt of the first code in the notification and implementing a second type of adjustment to the load balancing algorithm different than the first type of adjustment responsive to receipt of the second code in the notification, the second code being different from the first code;
  wherein the first code indicates that a particular portion of the notification contains a current port load value for the given port and wherein the multi-path input-output driver provides the first type of adjustment based at least in part on the current port load value; and
  wherein the second code indicates that a particular portion of the notification contains information specifying an amount of time that the multi-path input-output driver should wait before sending additional input-output operations to the given port and wherein the multi-path input-output driver provides the second type of adjustment based at least in part on the specified amount of time.

13. The computer program product of claim 12 wherein the multi-path input-output driver of the host device is configured to periodically send at least one predetermined command to one or more of the ports requesting a current port load value.

14. The computer program product of claim 13 wherein the predetermined command comprises at least one of the following commands:
  a vendor unique mode sense command;
  a vendor unique log sense command; and
  another type of vendor unique command.

15. The computer program product of claim 13 wherein the multi-path input-output driver of the host device is configured to utilize current port load values received from respective ones of the ports in response to the one or more predetermined commands to substantially evenly distribute processing of the input-output operations across the ports of the storage system in accordance with the load balancing algorithm.

16. The method of claim 11 wherein the multi-path input-output driver of the host device is configured to periodically send at least one predetermined command to one or more of the ports requesting a current port load value.

17. The method of claim 16 wherein the predetermined command comprises at least one of the following commands:
  a vendor unique mode sense command;
  a vendor unique log sense command; and
  another type of vendor unique command.

18. The method of claim 16 wherein the multi-path input-output driver of the host device is configured to utilize current port load values received from respective ones of the ports in response to the one or more predetermined commands to substantially evenly distribute processing of the input-output operations across the ports of the storage system in accordance with the load balancing algorithm.

19. The method of claim 11 wherein the notification comprises a current port load value for the given port that is greater than the threshold level of port load.

20. The method of claim 11 wherein the notification comprises an indication that at least one input-output operation previously delivered to the given port by the host device is designated as a failed input-output operation.

* * * * *